United States Patent
Hiraiwa (10) Patent No.: US 9,347,499 B2
(45) Date of Patent: May 24, 2016

(54) SHIFT DEVICE WITH SYNCHRONIZER

(71) Applicant: Kyowa Metal Works Co., Ltd., Yokohama-shi (JP)

(72) Inventor: Kazuyoshi Hiraiwa, Yokohama (JP)

(*) Notice: Subject to any disclaimer, the term of this patent is extended or adjusted under 35 U.S.C. 154(b) by 199 days.

(21) Appl. No.: 14/059,986

(22) Filed: Oct. 22, 2013

(65) Prior Publication Data

US 2014/0109707 A1    Apr. 24, 2014

(30) Foreign Application Priority Data

Oct. 24, 2012 (JP) .................................. 2012-235112

(51) Int. Cl.
*F16D 23/02*    (2006.01)
*F16D 23/06*    (2006.01)

(52) U.S. Cl.
CPC .............. *F16D 23/025* (2013.01); *F16D 23/06* (2013.01); *Y10T 74/19284* (2015.01)

(58) Field of Classification Search
CPC .............................. F16D 23/025; F16D 23/06
See application file for complete search history.

(56) References Cited

U.S. PATENT DOCUMENTS

| 4,315,564 | A* | 2/1982 | Numazawa et al. ........ 192/53.34 |
| 2013/0205929 | A1* | 8/2013 | Hiraiwa ........................... 74/339 |
| 2014/0109706 | A1* | 4/2014 | Hiraiwa ........................... 74/339 |

FOREIGN PATENT DOCUMENTS

| EP | 1 340 925 | 9/2003 |
| JP | 09-089002 | 3/1997 |
| JP | 2002-174261 | 6/2002 |
| JP | 2004-44648 | 2/2004 |
| WO | 2009/076691 | 6/2009 |

* cited by examiner

*Primary Examiner* — Terence Boes
(74) *Attorney, Agent, or Firm* — Wenderoth, Lind & Ponack, L.L.P.

(57) ABSTRACT

A shift device has lever members arranged between a sleeve, a hub, and synchronizer rings to amplify and transmit pressing force of the sleeve to one of the synchronizer ring. The lever members include a top portion and arm portions at the both sides of the top portion. The lever members are provided with a torque receiving surface capable of receiving friction torque from projections of the synchronizer rings on an intermediate portion of each arm portion between the top portion and a second slide surface provided on each end of the arm portions.

20 Claims, 10 Drawing Sheets

SHIFT DEVICE WITH SYNCHRONIZER

BACKGROUND OF THE INVENTION

1. Field of the Invention

The present invention relates to a shift device with a synchronizer for a transmission in which pressing force applied to a shift sleeve can be amplified into larger pressing force acting on a synchronizer ring while gears of the transmission are shifted, thereby reducing operating force necessary for a driver or an actuator.

2. Description of the Related Art

A shift device with a synchronizer for a transmission of this kind is disclosed in Japanese unexamined patent application publication No. 09-89002. This conventional shift device is used to shift gears between fifth-speed and reverse speed. It has a hub, a shift sleeve, a synchronizer ring capable of being pressed toward a fifth-speed gear, and a plurality of lever members provided between the synchronizer ring and the hub. The lever members change an axial pressing force from the shift sleeve into an amplified axial pressing force that acts on the synchronizer ring when the sleeve is being moved toward the fifth-speed gear, and they transmit the axial pressing force from the sleeve toward the reverse gear (in an opposite direction to the fifth-speed gear) to the fifth-speed gear so that the synchronizer ring and the fifth-speed gear are synchronized. This enables the sleeve rotating due to inertia of a clutch disc to stop the rotation thereof, and then the sleeve is smoothly engaged with the reverse gear. Thus the shift device can be a simple device using the lever members at lower manufacturing costs to decrease gear engagement noise in a shift operation to the reverse-speed position.

In the shift operation to the reverse-speed position, the friction torque of the synchronizer ring presses the lever members to extend them outwardly in the radial direction to prevent the sleeve from further advancing before the synchronization between the fifth-speed gear and the sleeve is ended.

When the synchronization is ended, the blocking force of the synchronizer ring due to the friction torque vanishes. Accordingly, the slanted surfaces formed on the inner surface of the sleeve press the lever members inwardly in the radial direction, so that the sleeve moves toward and engages with the reverse gear.

Another shift device with a synchronizer for a transmission of this kind is disclosed in Japanese unexamined patent application publication No. 2002-174261.

This conventional shift device has a plurality of lever members that are arranged at an axial middle position of a hub. The lever members are formed to be smaller to improve a shift feeling by decreasing operating force to push the lever members to an inner side after synchronization is ended to move a shift sleeve toward a high-speed gear in a shift operation at a high rotation speed. The same lever members are used to obtain in the synchronization toward one of the speed gears and the other thereof.

These conventional shift devices with the synchronizer, however, encounter the following problems.

In the former conventional device, the lever members thereof are inserted into a recessed portion (a groove portion formed in a circumferential direction) of the hub, being formed in an appropriately semicircular arc-like shape in a front view. This causes the lever members to become larger in the circumferential direction thereof. The thickness thereof needs to be larger to ensure the necessary stiffness, and accordingly they become heavier to generate larger centrifugal force that acts on the lever members during a shift operation at a high rotational speed. The larger centrifugal force causes a driver's operating force for moving the shift sleeve to be larger when it presses the lever members toward the inner side after the synchronization is ended. Therefore, the former conventional device cannot avoid from the deterioration in a shift feeling.

On the other hand, the latter conventional device can avoid from the deterioration in the shift feeling at the high rotational speed by using the lever members that are small in size and lighter in weight. The top portions of the lever members are, however, easily disengaged from inner splines of the shift sleeve when the lever members sometimes happen to be inclined toward a speed gear arranged at the one side in a state where the sleeve is engaged with another speed gear arranged at the opposite side. To avoid this problem, the shift sleeve needs to be formed larger in an axial direction thereof.

It is, therefore, an object of the present invention is to provide a shift device with a synchronizer for a transmission which overcomes the foregoing drawbacks and in which can decrease the both of the length in a circumferential direction of lever members and the axial length of a shift sleeve, ensuring a good shift feeling.

SUMMARY OF THE INVENTION

According to the present invention there is provided a shift device with a synchronizer which includes a shaft, a hub, a shift sleeve, two speed gears, two synchronizer rings, and a plurality of lever members. The hub has a boss portion, a flange portion, and an annular portion. The boss portion is fixed to the shaft, the flange portion extends from the boss portion outwardly in a radial direction, and the annular portion is provided on an outer end portion of the flange portion and has outer splines on an outer side of the annular portion. A plurality of cut-off portions and a plurality of recessed portions are formed at the both side in an axial portion. The cut-off portions are provided with first guide surfaces on the both sides in a rotational direction. The recessed portions are provided with a second guide surface parallel to the first guide surface on the both sides in the radial direction.

The shift sleeve has inner splines on an inner circumference side. The inner splines are provided with slanted surfaces, being engaged with the outer splines of the hub in such a way that the shift sleeve is supported on the hub to be movable in the axial direction.

The speed gears are rotatably supported on the shaft, being arranged at the both sides in the axial direction of the hub, respectively. The speed gears have splines engageable with the inner splines of the shift sleeve and a cone surface each at a hub side of the speed gears.

The synchronizer rings are arranged between the hub and the speed gears, respectively, to have a friction surface, a plurality of projections, and a plurality of pressure-receiving surfaces. The friction surface is provided on an inner side of the synchronizer ring so as to be capable of being pressed selectively on one of the cone surfaces of the speed gears. The projections are capable of transmitting friction torque generated between the cone surface of the speed gear and the friction surface of the synchronizer ring. The pressure-receiving surfaces are capable of receiving axial pressing force generated due to an axial movement of the shift sleeve.

The lever members are arranged at the both sides of the hub among the shift sleeve, the hub and the synchronizer rings, having a top portion and arm portions provided at the both sides in the rotational direction of the top portion. The top portion is provided on the both sides in the rotational direction thereof with a first slide surface contactable with the first guide surface of the hub and a press surface at a hub side thereof. The arm portion is provided on an end thereof in the rotational direction with a second slide surface contactable with the second guide surface of the hub. The top portion is engaged with the corresponding cut-off portion of the hub and contactable with the corresponding slanted surface of the shift sleeve to function as a point of effort of leverage. Contact portions between radially inner sides of the arm portions and the hub function as a fulcrum of the leverage, contact portions between the pressure receiving surface of the synchronizer rings and the press surfaces of the top portions function as appoint of load of the leverage. That is, the lever members amplify pressing force from the shift sleeve due to a leverage operation to transmit amplified force to the synchronizer rings. The lever members are further provided with a torque receiving surface capable of receiving friction torque from the projections of the synchronizer rings on an intermediate portion of each arm portion between the top portion and the second slide surface.

Preferably, the lever members include a plurality of first lever members used for pressing one of the synchronizer rings, and a plurality of second lever members used for pressing the other of the synchronizer rings. The first lever members and the second lever members are alternately arranged at the both sides of the hub with a phase shift in the rotational direction.

Preferably, the recessed portion at one side of the hub and the recessed portion at the other side thereof are partially overlapped in the axial direction.

Preferably, the shift device further includes a spring that always pushes the lever members outwardly in the radial direction.

Preferably, the spring includes elastic portions each acting elastic force to the corresponding lever member outwardly in the radial direction between the lever members and the boss portion of the hub. The elastic portions corresponding to the plurality of lever members are connected with each other.

Preferably, the spring includes at least one of a first surface and a second surface. The first surface is inserted between the lever member and the hub, and the second surface is inserted between the lever member and the pressure receiving surface of the synchronizer ring.

Preferably, the hub is provided with a first supporting portion capable of supporting a first outer-diameter portion at a speed-gear side end portion of the synchronizer ring and a second supporting portion capable of supporting a second outer-diameter portion formed by the projections of the synchronizer rings.

Preferably, at least one of the synchronizer rings comprises a first synchronizer ring at an outer side in the radial direction, a second synchronizer ring at an inner side in the radial direction, and an intermediate ring arranged between the first synchronizer ring and the second synchronizer ring. The intermediate ring rotates together with the speed gear, being provided with a first cone surface and a second cone surface. The first synchronizer ring is provided with the friction surface capable of being pressed on the first cone surface, and the plurality of projections and the pressure receiving surfaces on a hub side of the first synchronizer ring. The second synchronizer ring is provided with the friction surface capable of being pressed on the second cone surface of the intermediate ring and with a plurality of projections engageable with radially inner sides of the arm portions of the lever member at the hub side. The lever members includes the arm portions at both sides of the top portion in the rotational direction, and the arm portions are formed on inner sides thereof in the radial direction with second torque receiving surfaces capable of receiving the friction torque from the projections of the second synchronizer ring.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Throughout the following detailed description, similar reference characters and numbers refer to similar elements in all figures of the drawings, and their descriptions are omitted for eliminating duplication.

Figure 1:
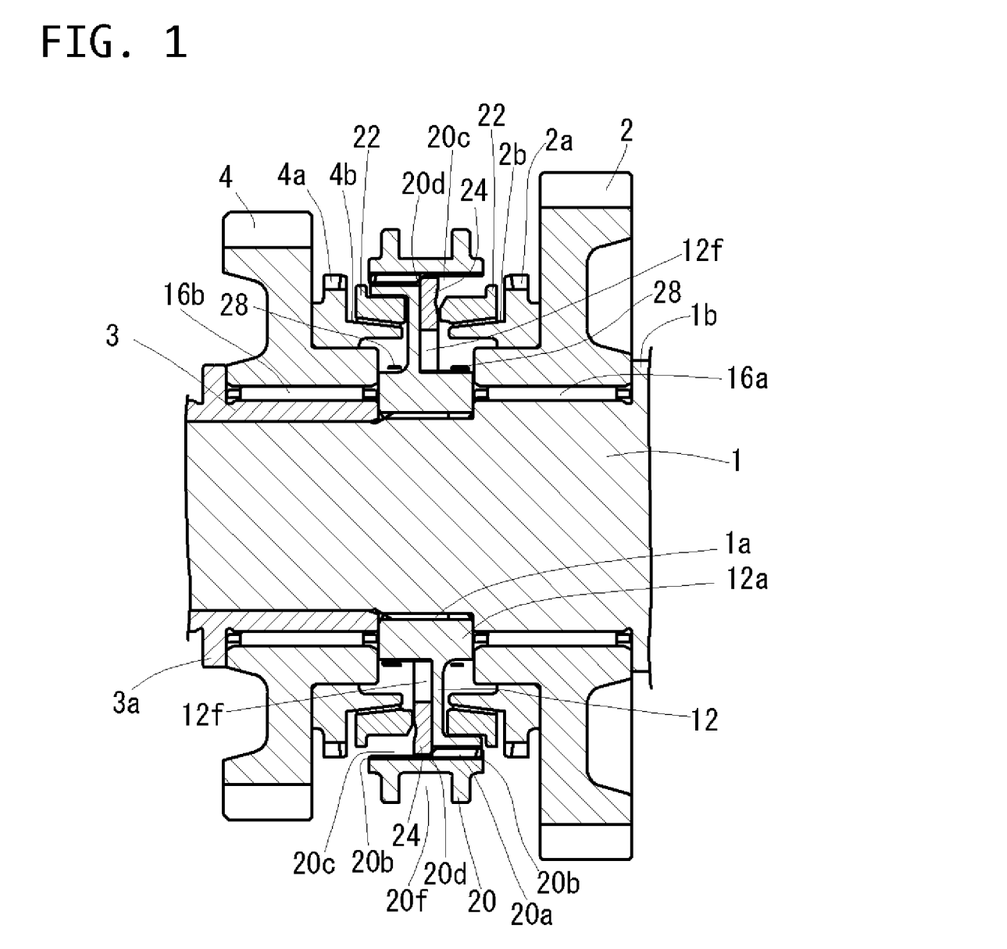
FIG. 1 is a cross-sectional side view showing a shift device with a synchronizer of a first embodiment according to the present invention, taken along a line A-A in FIG. 2.

Referring to FIG. 1, there is shown a shift device of a preferred first embodiment according to the present invention, which is adapted for a transmission of a motor vehicle. In the embodiment, the shift device is applied to selectively obtain first-speed and second speed in the transmission.

The shift device includes an output shaft 1, a hub 12, a first-speed drive gear 2, a second-speed gear 4, a shift sleeve 20, two synchronizer rings 22 and two lever members 24.

The output shaft 1 is connected with a pair of drive wheels through a final unit having differential gears. The output shaft 1 is provided with outer splines 1a on an external surface of a central portion thereof. The outer splines 1a are engaged with inner splines of the hub 12, and the hub 12 is restrained from moving in an axial direction by using a bush 3 and a boss portion of the first-speed gear 2.

The first-speed gear 2 is rotatably supported on the output shaft 1 through a bearing 16a between the boss portion 12a of the hub 12 and a flange portion 1b of the output shaft 1. Similarly, the second-speed gear 2 is rotatably supported on the output shaft 1 through a bearing 16b between the boss portion 12a of the hub 12 and a flange portion 3a of the bush 3 fixed to the output shaft 1. Therefore, the first-speed gear 2 and the second-speed gear 4 are allocated at the both sides of the hub 12, respectively.

The first-speed gear 2 and the second-speed gear 4 are always engaged with a not-shown first input gear and a not-shown second input gear, respectively. These input gears are integrally formed with a not-shown input shaft arranged parallel to the output shaft 1 to be inputted with output power of an engine.

The first-speed drive gear 2 is provided at its hub side with spline teeth 2a and a cone surface 2b. Similarly, the second-speed gear 4 is provided at its hub side with spline teeth 4a and a cone surface 4b.

The first-speed drive gear 2 and the second speed gear 4 correspond to speed gears of the present invention.

Figure 3:
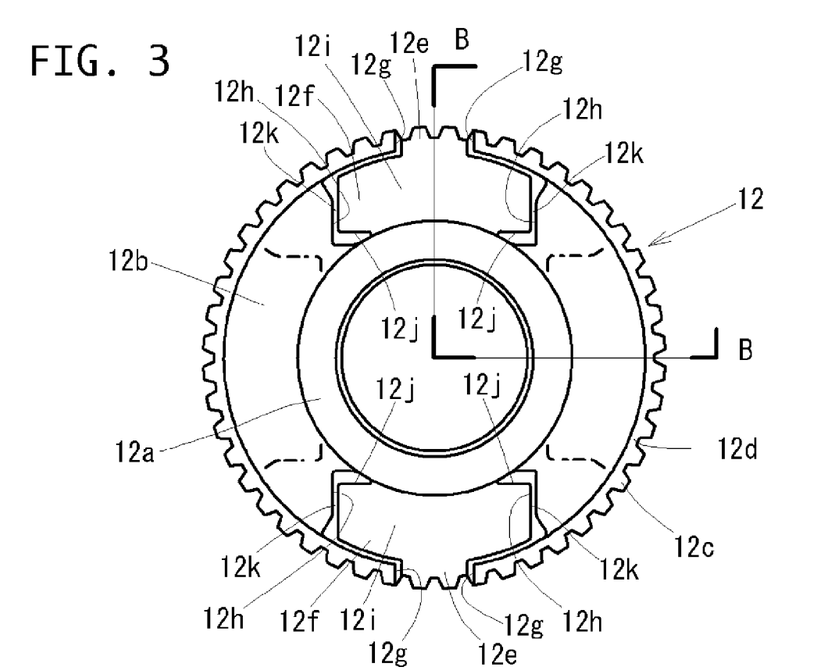
FIG. 3 is a front view showing the hub from which the lever members, the spring and the synchronizer ring are removed.
Figure 4:
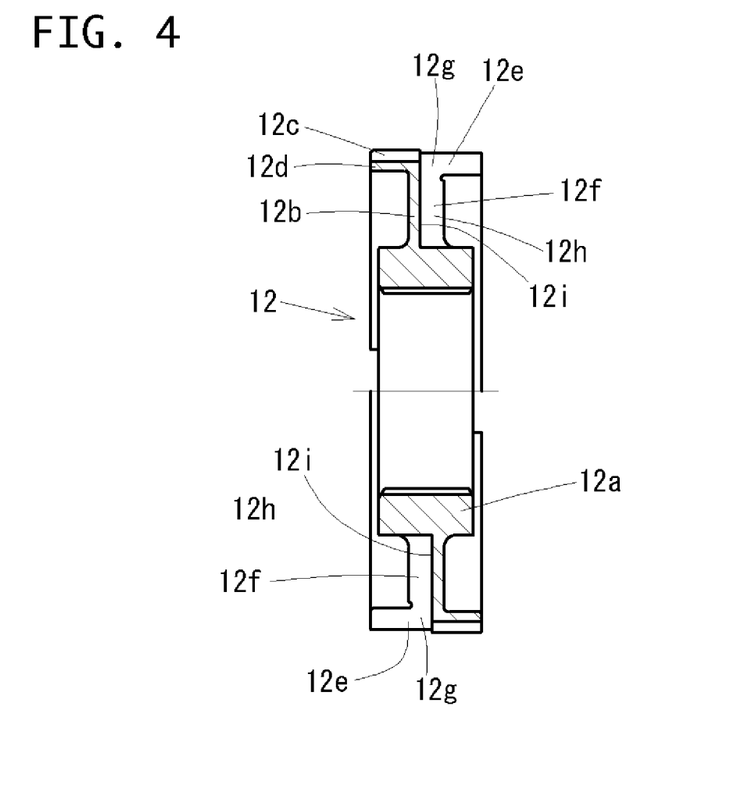
FIG. 4 is a cross-sectional side view of the hub, taken along a line B-B in FIG. 3.

As shown in FIGS. 3-4, the hub 12 has the boss portion 12a, a flange portion 12b extending from the boss portion 12a outwardly in the radial direction, and an annular portion 12d formed on an outer circumferential end portion of the flange portion 12d. Two cut-off portions 12e and two recessed portions 12f are formed at each sides of the hub 12 to extend from the annular portion 12 to the flange portion 12b. The recessed portions 12f are arranged at positions corresponding to those of the cut-off portions 12e, respectively. The cut-off portions 12e and the recessed portions 12f have 90 degree phase shift (Namely, they are arranged at 90° intervals.) in the rotational direction between at the first speed gear side and at the second speed gear side. The cut-off portions 12e at the same side are arranged at the positions opposite to each other in the radial direction. Similarly, the recessed portions 12f at the same side are arranged at the positions opposite to each other in the radial direction.

As shown in FIG. 1, the recessed portion 12f at a first-speed gear side and the recessed portion 12f of a second-speed gear side are partially overlapped with each other in the axial direction.

In addition, the cut-off portions 12e are provided on the both sides thereof in the circumferential direction with a first guide portion 12e, and the recessed portions 12f are provided on the both sides thereof in the circumferential direction with a second guide surface 12h parallel to the first guide surface 12g.

Further, the recessed portions 12f have a bottom surface 12i at an inner side in the radial direction. As shown in FIG. 3, groove portions 12k with an edge portion 12j are provided in the vicinity of the bottom surfaces, respectively. The edge portions 12j and the lever members 24 function as a fulcrum of the leverage as described below.

The shift sleeve 20 is arranged on the outer side of the annular portion 12d of the hub 12 in such a way that inner splines 20a formed on the inner surface of the sleeve 20 are always engaged with the outer splines 12c of the hub 12 so as to be movable relative to the hub 12 in the axial direction. That is, in a state where the shift operation to the first-speed position is ended, the sleeve 20 is moved toward the right side in FIG. 1 and its inner splines 20a are engaged with the spline 2a of the first-speed drive gear 2. Similarly, in the state where the shift operation to the first-speed position is ended, the sleeve 20 is moved toward the left side in FIG. 1 and its inner splines 20a are engaged with the spline 4a of the second-speed drive gear 4.

The inner splines 20a are formed on the both end portions thereof with a chamfer 20b. In addition, the inner splines 20a are formed with a cut-off portion 20e along the circumference thereof at positions corresponding to the cut-off portions 12e of the hub 12, and the cut-off portions 20e are formed on end portions thereof with a slanted surface 20d.

The cut-off portions 20c and the slanted surfaces 20d are arranged with 90 degree phase shift in the rotational direction between at the first-speed gear side and at the second-speed gear side.

Figure 5:
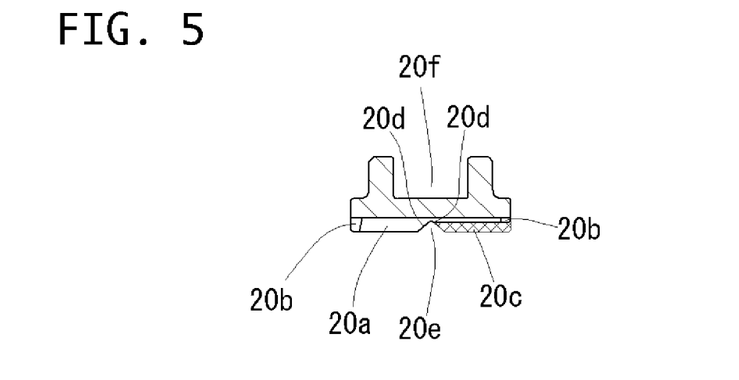
FIG. 5 is an enlarged cross-sectional view showing a part of a shift sleeve used in the shift device.

FIG. 5 shows how to form the cut-off portions 20c and the slanted surfaces 20d of shift sleeve 20.

First, a groove 20e with the slanted surfaces 20d is formed on the inner splines 20a at the middle position thereof. Then portions of the inner splines 20a indicated by cross-hatchings in FIG. 5 are cut off. The slanted surfaces 20d on remaining portions function as the points of effort of the leverage, and they press the top portions 24a of the lever members 24 in the axial direction during the synchronization operation.

The sleeve 20 is further formed with a circular groove 20f on the outer circumference thereof to receive a not-shown shift fork that is operated by a hand of a driver or an actuator so that the shift sleeve 20 can be operated to move in a right and left direction in FIG. 1. FIG. 1 shows a state where the shift sleeve 20 is positioned at a neutral position. The shift sleeve 20 is moved toward the right side in FIG. 1 to establish the first speed, while it is moved toward the left side to establish the second speed.

As shown in FIG. 1, the synchronizer rings 22 are arranged between the first-speed drive gear 2 and the hub 12 and between the second-speed gear 4 and the hub 12, respectively. As they are arranged symmetrically with reference to the hub 12, Hereinafter the first-gear side will be mainly described.

Figure 6:
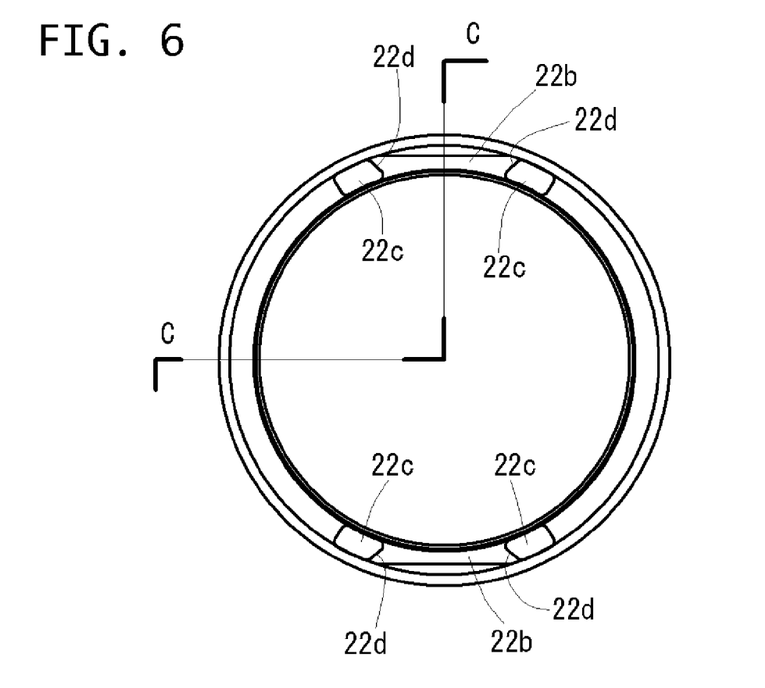
FIG. 6 is a front view of the synchronizer ring.
Figure 7:
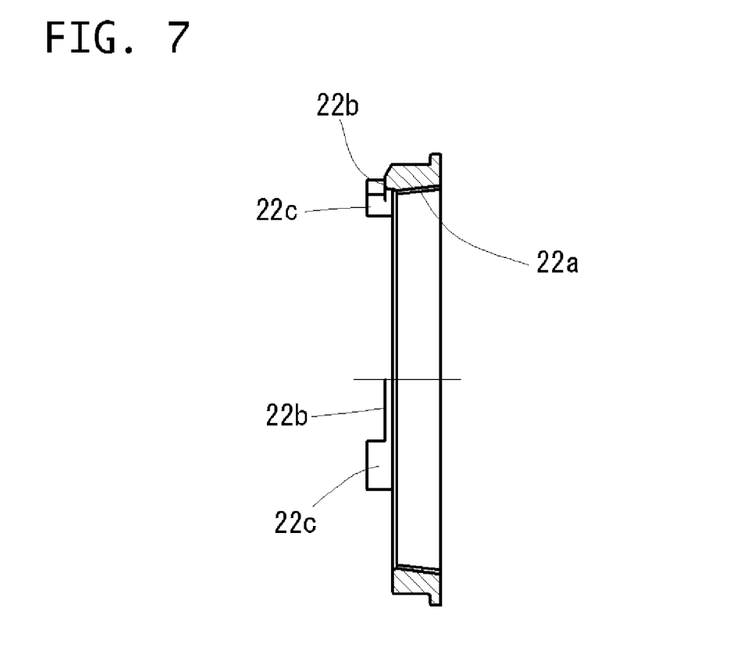
FIG. 7 is a cross-sectional side view showing the synchronizer ring, taken along a line C-C in FIG. 6.

As shown in FIGS. 1, 6 and 7, the synchronizer ring 22 is formed on the inner side thereof with a cone-shaped friction surface 22a corresponding to the cone surface 2b of the first-speed drive gear 2 and it is formed with pressure-receiving surfaces 22b at the hub side and with two projections 22c each at two positions corresponding to the recessed portions 12f of the hub 12. The projections 22c are formed with slanted surfaces 22d on pressure-receiving surface sides thereof. The slanted surfaces 22d press the lever members 24 outwardly in the radial direction during the synchronization operation.

The pressure-receiving surfaces 22b function as the points of load of the leverage, and they are pressed in the axial direction by the lever members 24.

As shown in FIG. 1, the two lever members 24 are arranged among the synchronizer rings 22, the hub 12 and the sleeve 20.

Specifically, the lever member 24 at the first-speed gear side is arranged in the recessed portion 12f at the first-speed gear to correspond to a first lever member of the present invention. The lever member 24 at the second-speed gear side is arranged in the recessed portion 12f at the second-speed gear to correspond to a second lever member of the present invention.

Figure 8:
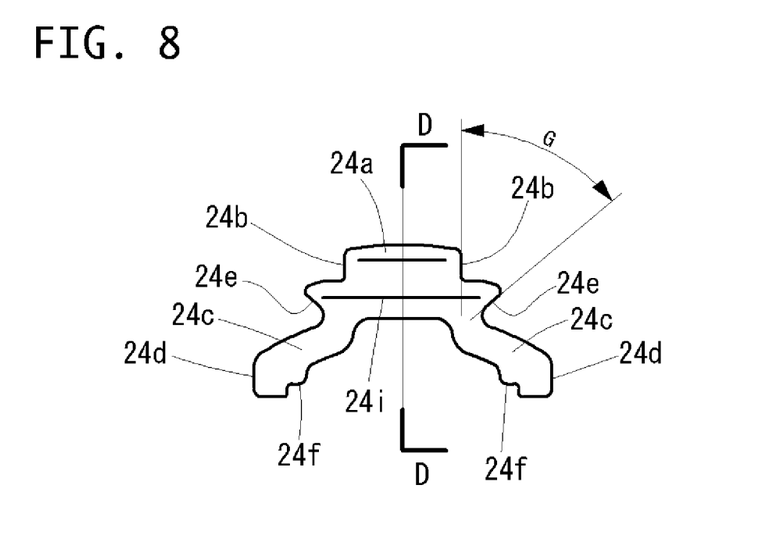
FIG. 8 is a front view of the lever member.
Figure 9:
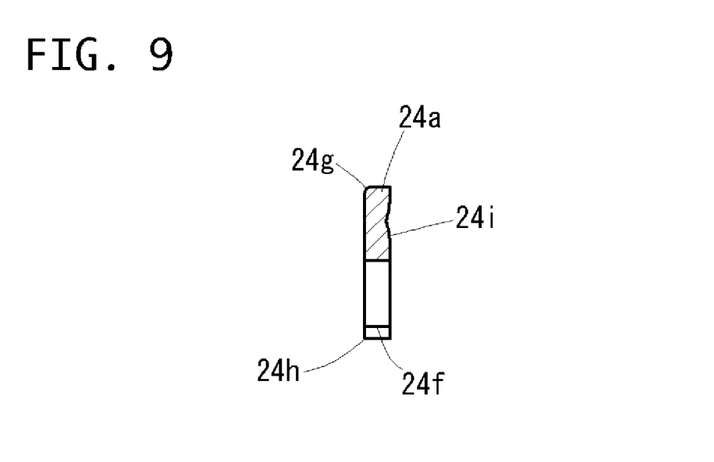
FIG. 9 is a cross-sectional side view showing the lever member.

As shown in FIGS. 8 and 9, the lever members 24 are formed with the top portion 24a at a middle portion thereof, and the top portion 24a is formed with first slide surfaces 24b on the both side surfaces thereof corresponding to the first guide surfaces 12g of the hub 12 in the front view of FIG. 8.

In addition, the top portion 24a is provided with arm portions 24c at the both sides thereof, and the arm portions 24c have the shape corresponding to the recessed portion 12f of the hub 12. The arm portions 24c are provided with second slide surfaces 24d on the both ends thereof, and the second slide surfaces 24d have the shapes corresponding to the second guide surfaces 12h of the hub 12.

Therefore, the lever members 24 are capable of moving and swinging in the radial and axial directions with reference to the hub 12, being guided by the first guide surfaces 12g and the second guide surfaces 12h of the hub 12.

In addition, two torque-receiving surfaces 24e are formed on the outer sides of the arm portions 24c between the top portion 24a and the slide surfaces 24d, respectively, and two spring receiving surfaces 24f are formed at the inner sides of the arm portions 24f, respectively.

Figure 2:
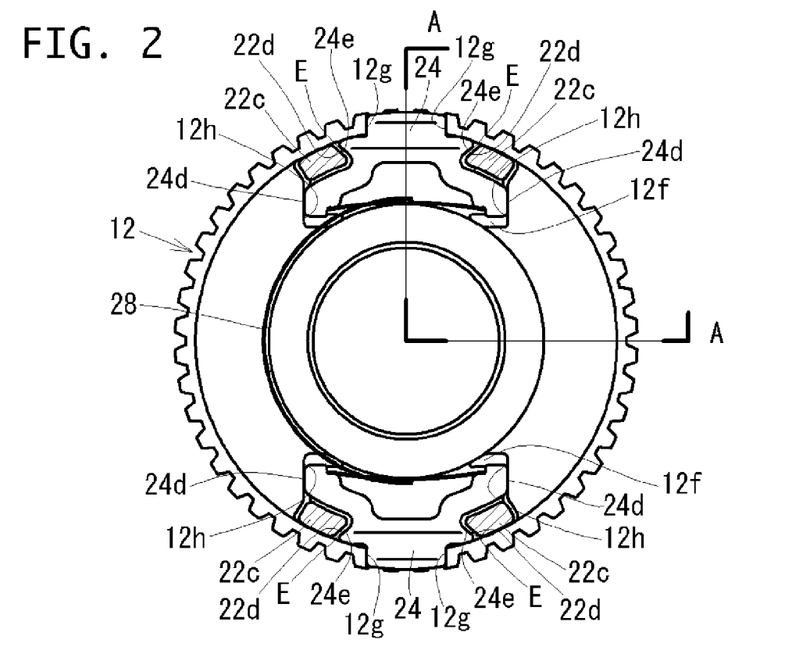
FIG. 2 is a front view showing a hub with lever members, a spring and a synchronizer ring, which are used in the shift device of FIG. 1.

FIG. 2 shows a neutral state of the shift device, where there are a clearance E in the rotational direction between the torque receiving surfaces 24e and the slanted surfaces 22d of the synchronizer ring 22, so that the synchronizer ring 22 can rotate with the clearance E relative to the hub 12.

The clearance E is set in such a way that it becomes smaller when the synchronization is ended and the lever members 24 move inwardly in the radial direction so that a range where the synchronizer ring 22 can rotate becomes almost none.

The torque-receiving surfaces 24e are set to respectively have an angle G, shown in FIG. 8, relative to the first slide surfaces 24b and the second slide surfaces 24d in such a way that they contact with the slanted surfaces 22d of the synchronizer ring 22 so that the lever members 24 are pressed outwardly in the radial direction during the synchronization operation.

The top portions 24a are formed with a slightly-round edge 24g, shown in FIG. 9, on the hub sides thereof to be capable of being pressed by the slanted surfaces 20d of the sleeve 20. The edges 24g may be formed to have a slanted surface instead of the round surface. The edges 24g function as the points of efforts of the leverage.

The arm portions 24c are formed with an edge 24h, shown in FIG. 9, at the hub sides of the inner portions thereof. The vicinities of the edges 24g and the bottom surfaces 12i of the hub 12 function as the fulcrums of the leverage during the synchronization operation.

In addition, the lever members 24 are formed at the hub sides thereof with a press portion 24i, which presses the synchronizer ring 22 in the axial direction during the synchronization operation. The press portions 24i function as the points of load of the leverage.

Figure 10:
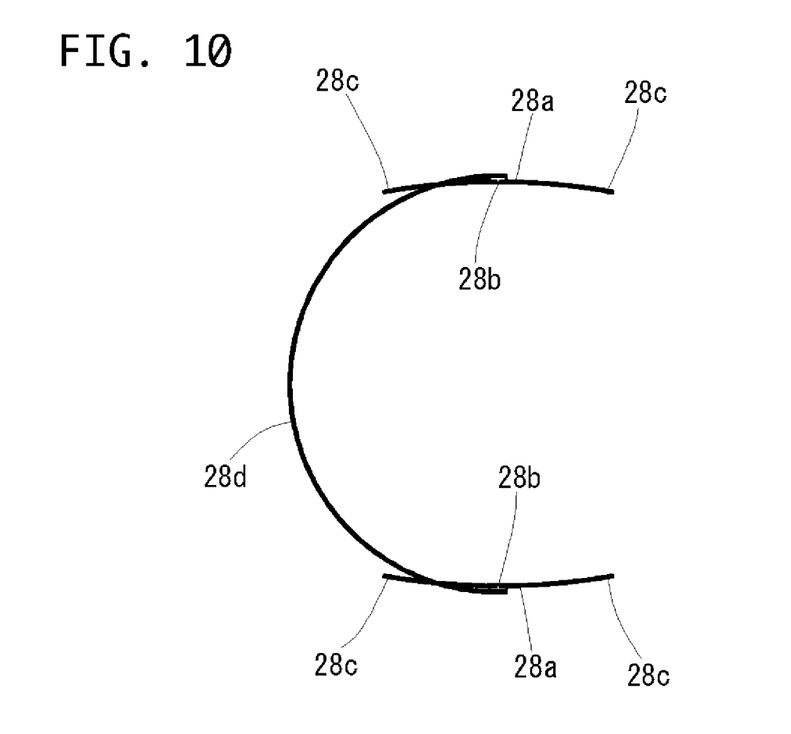
FIG. 10 is a front view showing the spring.
Figure 11:
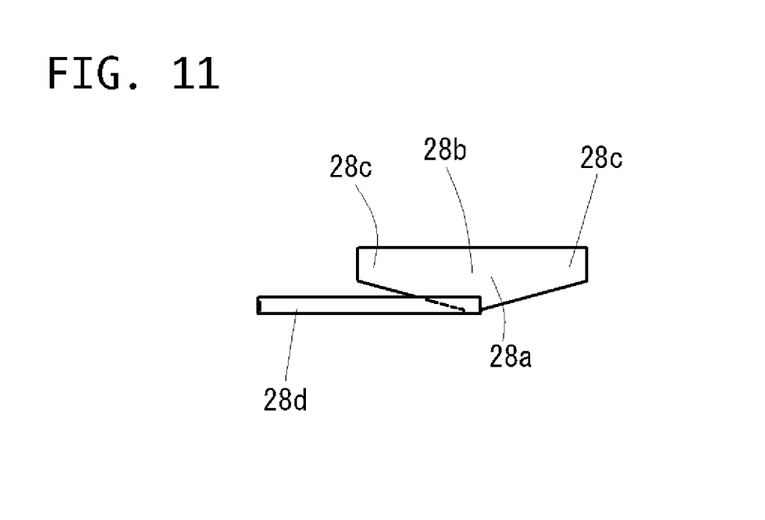
FIG. 11 is a top view showing the spring.

A spring 28 is arranged between the two lever members 24 and the boss portion 12a of the hub 12.

The spring 28 employs a thin plate made of spring steel, having elastic portions 28a respectively corresponding to the two lever members 24. The elastic portions 28a have a supporting portion 28b at intermediate portions thereof to contact with the hub 12, and a press portion 28c at an end portions thereof to contact with the spring receiving surface 24f of the lever member 24. The elastic portions 28a act their elastic force on the lever members 24 outwardly in the radial direction. The two supporting portions 28b are connected by a connecting portion 28d shaped like a letter C. Therefore, the two lever members 24 are pushed only by the one spring 28.

The operation of the shift device of the first embodiment will be described. In order to shift from the neutral position shown in FIG. 1 to the first speed in a state where the rotational speed difference exists between the output shaft 1 and the first speed gear 2, the sleeve 20 is moved toward the first speed gear 2. The slanted surfaces 20d of the sleeve 20 contact with the edges 24g of the lever members 24g, and the sleeve 20 presses the lever members 24 in the axial direction.

As the lever members 24 are pressed outwardly in the radial direction by the elastic force of the spring 28, the top portions 24a of the lever members 24a are pressed by the slanted surfaces 20d of the sleeve 20 and moved, being swung. Then the press portions 24i press the pressure-receiving surfaces 22b of the synchronizer ring 22 at the first-speed gear side in the axial direction. Consequently, the friction surface 22a of the synchronizer ring 22 is pressed on the cone surface 2b.

As there is the rotational speed difference between the output shaft 1 and the first speed gear 2, the friction generates between the friction surface 22a and the cone surface 2b to apply friction torque to the synchronizer ring 22. This rotates the synchronizer ring relative to the hub 12 and the lever members 24 in one of the rotational directions to decrease the clearance E. In other words, as the synchronizer ring 22 is allowed to rotate with the clearance E relative to the hub 12 and the lever members 24, it rotates until the projections 22c contact with the torque-receiving surfaces 24e of the lever members 24. The friction torque acts on the torque-receiving surfaces 24e to press the lever members 24 outwardly in the radial direction.

Figure 12:
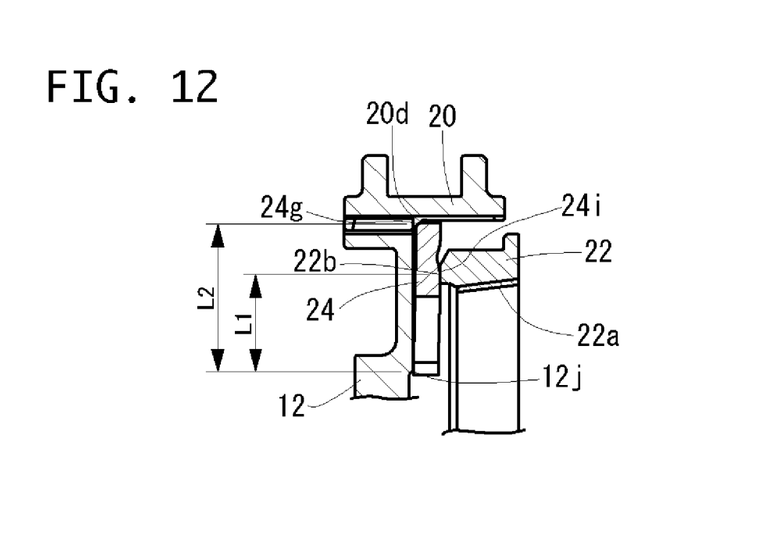
FIG. 12 is a cross-sectional side view explaining an operation of the first embodiment.

When the sleeve 20 presses the top portions 24a of the lever members 24 in the axial direction, the lever members 24 amplifies the pressing force due to the leverage to press the synchronizer ring 24 as shown in FIG. 12 where a part of the hub 12 is removed so as to be easily understood.

That is, in the lever members 24, the edges 24g of the top portions 24a function as the point of effort, the edges 12j where the vicinities of the edges 24h contact with the hub 12 function as the fulcrums, and the press portions 24i function as the points of load. The leverage ratio is L2/L1, where the lengths of L1 and L2 are indicated in FIG. 12.

At this time, the friction torque generated between the friction surface 22a and the cone surface 2b press the torque receiving surfaces 24e of the lever members 24 outwardly in the radial direction. The angles of the friction surface 22a and the cone surface 2b, the inclined angles of the slanted surfaces 20d and the angles G of the torque receiving surfaces 24e are set in such a way that the pressing force to the outer side becomes larger than the force where the lever members 24 are pressed to the inner side by the slanted surfaces 20d of the sleeve 20.

Setting the angles like above, the sleeve 20 is prevented from further moving, pressing the lever member 24 inwardly in the radial direction, as long as the friction torque exists between the friction surface 22a and the cone surface 2b.

Accordingly, the sleeve 20 maintains to press the synchronizer ring 22 due to the leverage of the lever members 24 as long as the rotational speed difference exists between the output shaft 1 and the first speed gear 2. That is, the synchronization operation is carried out due to the friction torque generated between the friction surface 22a and the cone surface 2b.

This synchronization operation decreases the rotational speed difference between the output shaft 1 and the first speed gear 2, and the friction torque between the friction surface 22a and the cone surface 2b vanishes when the rotational speed difference becomes zero.

When the friction torque vanishes, the slanted surfaces 20d of the sleeve 20 becomes to be able to easily press the lever members 24 inwardly in the radial direction and move toward the first speed gear 2. At this time, the synchronization operation ends, the sleeve 20 moves toward the right side in FIG. 1, pressing the lever members 24 inwardly in the radial direction. Then, the inner splines 20a of sleeve 20 engage with the splines 2a of the first speed gear 2. This is the end of the shift operation to the first speed.

Incidentally, the shift operation to the second speed 4 is similar to that to the first speed gear 2, its movement in the axial direction being inverse relation to that in the shift operation to the first speed gear 2.

The shift device of the first embodiment can provide the following advantages.

The shift device can improve the synchronization ability because of the leverage operation of the lever members 24.

The torque receiving surfaces 24e of the lever members 24 capable of receiving the friction torque from the projections 22c of the synchronizer rings 22 are respectively formed on the intermediate portion of the arm portions 24c between the top portion 24a and the second slide surface 24d. This enables the lever members 24 to be smaller in size and lighter in weight.

Therefore, the centrifugal force acting on the lever members 24 become smaller, the operating force, which is necessary for pressing lever members 24 inwardly in the radial direction by the slanted surfaces 20d of the sleeve 20 after the synchronization operation is ended, becomes smaller in a state where the output shaft 1 rotates at high speed. This improves the operation feeling.

In addition, as the lever members 24 can be smaller, the lever members 24 at the firs-speed gear side and the lever members 24 can be prevented from being overlapped in the rotational direction. This enables the shift device to be constructed smaller in the axial direction.

Figure 13:
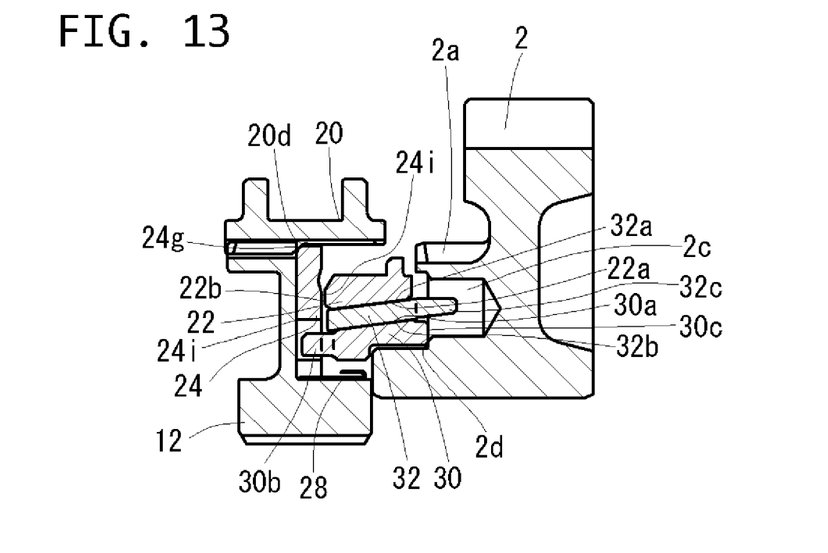
FIG. 13 is a cross-sectional side view showing a main part of a shift device of a second embodiment according to the present invention.
Figure 14:
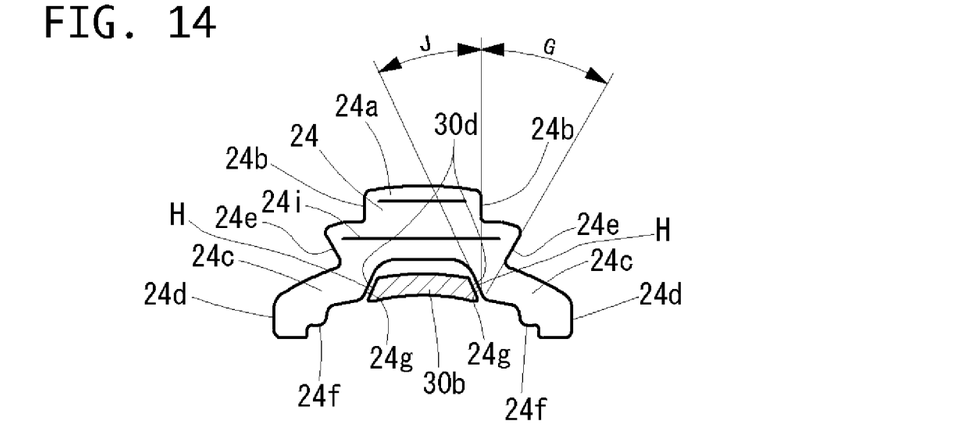
FIG. 14 is a front view showing a lever member of the second embodiment with which a projection of a second synchronizer ring is engaged.

Next, a shift device with a synchronizer of a second embodiment according to the present invention will be described with reference to the drawings of FIGS. 13 and 14.

The second embodiment is different from the second embodiment in that the former is constructed as a shift device with a multi-cone type synchronizer. Specifically, an intermediate ring 32 is disposed between a first synchronizer ring 22 at an outer side and a second synchronizer ring 30 at an inner side. The intermediate ring 32 is provided with a first cone surface 32a at an outer side and a second cone surface 32b to be contactable with an inner fiction surface of the first synchronizer ring 22 and an outer cone surface of the second synchronizer ring 30, respectably.

A plurality of projections 32c are provided on the first-speed gear side portion of the immediate synchronizer ring 32 to project in the axial direction so as to be engaged in holes 2c formed on the first speed gear 2. This enables the intermediate ring 32 to be movable relative to the first speed gear 2 in the axial direction, being rotatable together with the first speed gear 2.

The second synchronizer ring 30 is provided with a friction surface 30a and two projections 30b at the hub side thereof, and with an end surface 30c at the first-speed gear side thereof. The end surface 30c contacts with an end surface 2d of a boss portion of the first speed gear 2. In addition, the projections 30b are contactable with the inner sides of the lever members 24 with a play E in the rotational direction as shown in FIG. 14.

Slanted surfaces 30d are formed on the both sides of the projections 30b in the rotational direction, corresponding to second torque receiving surfaces 24g of the lever members 24.

Specifically, the second torque receiving surfaces 24g are set to have an angle J relative to the first and second slide surfaces 24b and 24d similarly to the first torque receiving surfaces 24e.

The friction torque acting on the second synchronizer ring 30 in the synchronization operation is transmitted from the projections 30b to the second torque receiving surfaces 24g to press the lever members 24 outwardly in the radial direction.

Incidentally, the end surface 2d of the first speed gear 2 and the end surface 30c at the first-speed gear side of the second synchronizer ring 2 are formed as a flat surface in the embodiment, while they may be formed as a cone surface, the first speed gear 2 being formed with a cone surface 2b and the second synchronizer ring 30 being formed with a third friction surface 30d at the first-speed gear side. This structure is called as a triple cone type.

The other construction is similar to that of the first embodiment.

The operation of the shift device of the second embodiment will be described.

The operation of the second embodiment is basically similar to that of the first embodiment. The shift device of the second embodiment has the intermediate ring 32 between the first synchronizer ring 22 and the second synchronizer ring 30, and accordingly the operations are different after the lever members 24 press the first synchronizer ring 22.

That is, when the lever members 24 press the first synchronizer ring 22, this pressing force presses the friction surface 22a against the first friction surface 32a of the intermediate ring 32, and then it presses the second cone surface 32b against the friction surface 30a of the second synchronizer ring 30. Further, the end surface 30c of the second synchronizer ring 30 press the end surface 2d of the first speed gear 2.

Consequently, the friction torque can generate between the friction surface 22a and the first cone surface 32 and between the second cone surface 32b and the friction surface 32, thereby providing the synchronizer capacity higher than that of the first embodiment. The other operation is similar to that of the first embodiment, and it is omitted.

Incidentally, the number of the cone friction surfaces that generate the friction torque becomes three when the cone surface 2b of the first speed gear 2 is formed with the third friction surface 30d at the first-speed gear side.

The shift device of the second embodiment can provide the following advantage in addition to those of the first embodiment.

In the second embodiment, the force pressing the synchronizer ring 22 against a speed-change gear (the first speed gear 2 for example) becomes larger due to the leverage operation of the lever members 24 and the friction torque generates at two areas. Therefore, the synchronization capacity becomes higher.

Figure 15:
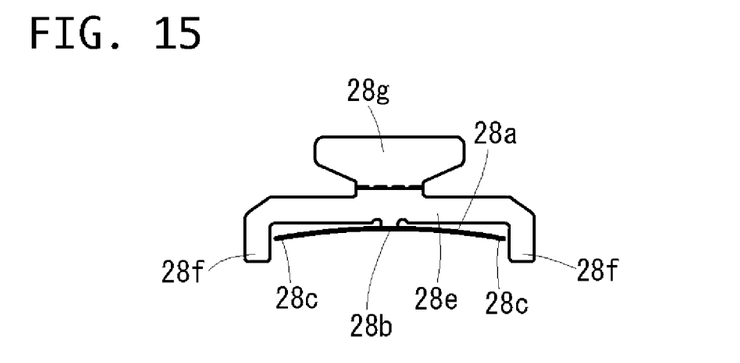
FIG. 15 is a front view showing a spring used in a shift device of a third embodiment according to the present invention.
Figure 16:
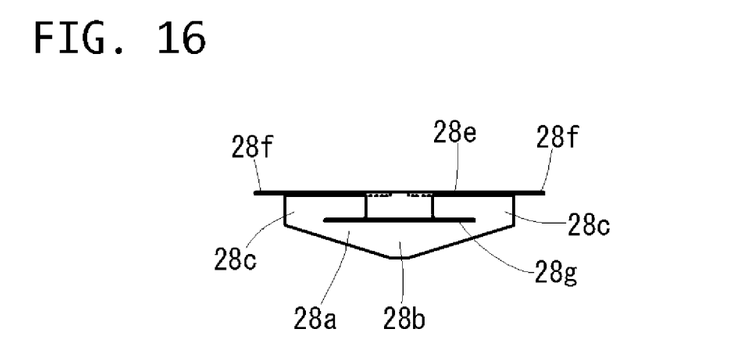
FIG. 16 is a top view showing the spring of the third embodiment.

Next, a shift device with a synchronizer of a third embodiment according to the present invention will be described with reference to the drawings of FIGS. 15 and 16.

The third embodiment is different from the first embodiment in a configuration of the spring 28 and also in that two springs 28 are provided for the lever members 24, respectively.

The springs 28 have an elastic portion 28a similarly to that of the first embodiment. The elastic portion 28a is provided at a central position thereof with a supporting portion 28b contacting with the buss portion 12a of the hub 12 and press portions 28c at the both ends of the spring 28 contact with the spring receiving surfaces 24f of the lever member so that the lever members 24 is pressed outwardly in the radial direction.

The hub-side supporting portion 28b is bent in a direction at the right angle to form a first surface 28e, the both ends of which are provided with a supporting surface 28f. The supporting surfaces 28f are inserted into the bottom portion 12i of the hub 12 and the edges 24h of the lever members 24. Accordingly, the supporting surface 28f and the edges 24h function as a fulcrum of the leverage.

On the other hand, a second surface 28g is formed parallel to the first surface 28e by being bent like a crank from the first surface 28e. The second surface 28g is inserted between the press portion 24i of the lever member 24 and the pressure receiving surface 22b of the synchronizer ring 22.

Incidentally, the axial length of the synchronizer ring 22 becomes shorter by the thickness between the supporting surface 28f and the second surface 28g.

The operation of the shift device of the third embodiment is as follows.

The operation of the third is basically similar to that of the first embodiment. The elastic portion 28a of the spring 28 presses the lever members 24 outwardly in the radial direction.

The difference between the configurations of the springs 28 brings the difference operations therebetween.

Each first surface 28f is inserted between the bottom portion 12i of the hub 12 and the edge 24h of the lever member 24, and accordingly the lever members 24 contact with the hub 12 through the supporting surfaces 28f so as to act as the leverage.

In addition, each second surface 28a is inserted between the press portion 24i of the lever member 24 and the pressure receiving surface 22b of the synchronizer ring 22, and accordingly the lever members 24 press the synchronizer ring 22 through the second surfaces 28g in the leverage operation. The other operation of the third embodiment is similar to that of the first embodiment.

The shift device of the third embodiment can provide the following advantage in addition to those of the first embodiment.

the edges 24b of the lever members 24 contact with the hub 12 through the supporting surfaces 28f of the spring 28 when the lever members 24 press the synchronizer ring 22 in the leverage operation. Therefore, the hub 12 can easily ensure the durability to withstand wear without a hardening treatment.

In addition, similarly, the second surface 28g of the spring 28 is inserted between the press portion 24i of the lever member 24 and the pressure receiving surface 22b of the synchronizer ring 22. Therefore, the synchronizer ring 22 can easily ensure the durability to withstand wear in a case where the synchronizer ring 22 is made of copper alloy, which is relatively soft.

Thus, in the third embodiment, the manufacturing costs of the hub 12 and the synchronizer ring 22 can be suppressed, the durability thereof being ensured.

Next, a shift device with a synchronizer of a fourth embodiment according to the present invention will be described with reference to the drawings of FIG. 17-20.

The fourth embodiment is different from the first embodiment in that the synchronizer rings 22 and the lever members 24 have configurations that are easily formed by press forming, using plate material such as an iron plate.

Figure 17:
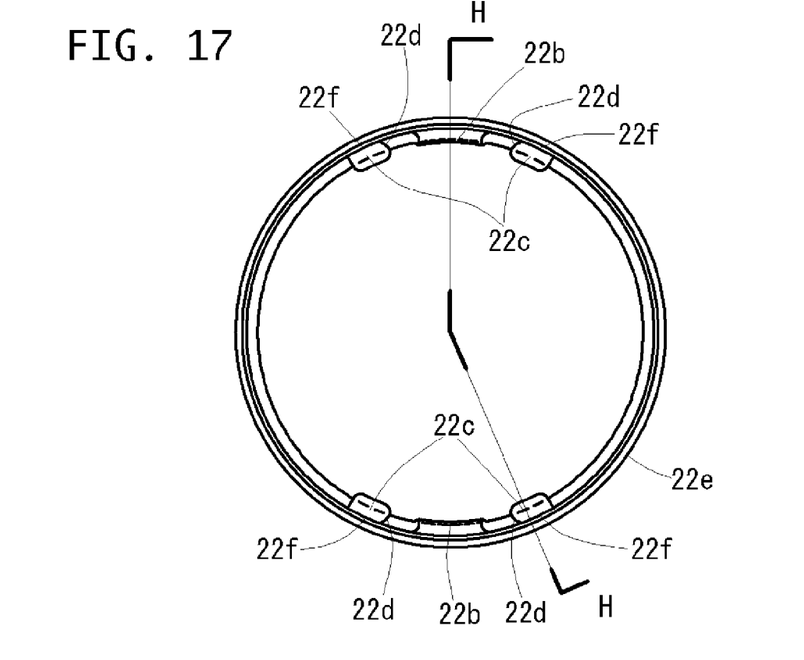
FIG. 17 is a front view showing a synchronizer ring which is used in a shift device of a fourth embodiment according to the present invention.
Figure 18:
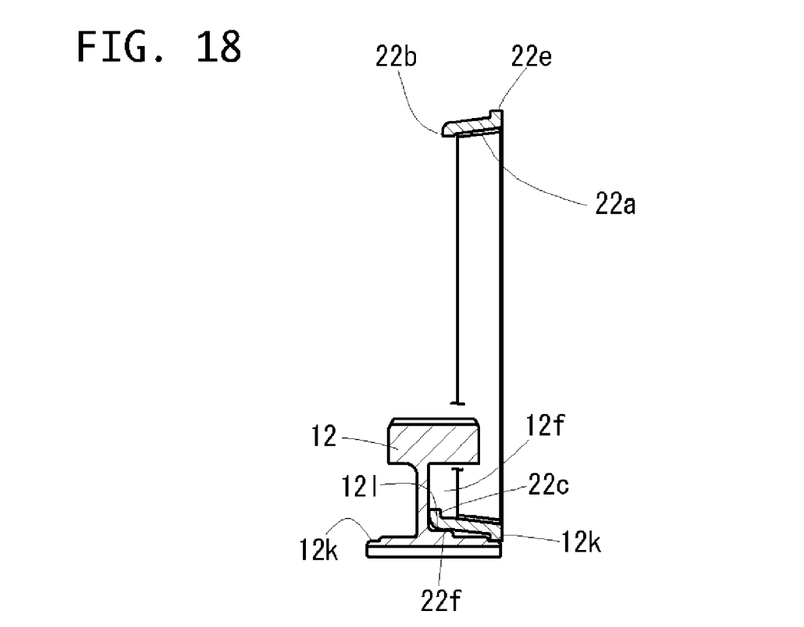
FIG. 18 is a cross-sectional view of the synchronizer ring shown in FIG. 17.

As shown in FIGS. 17 and 18, the synchronizer rings 22 have the annular portion with a configuration along the friction surface 22a shaped like a cone, and accordingly the configuration makes it difficult to support the synchronizer ring 22 at a position in the radial direction and in coaxial with the hub 12.

In the fifth embodiment, the synchronizer rings 22 are supported on the hub 12 by contacting a first outer diameter portion 22e at a first-speed gear side and outer surfaces (a second outer diameter portion) 22h of projections 22c at a hub side with the hub 12. On the other hand, the hub 12 is provided with a plurality of first support portions 12k and a plurality of second support portions 12fm on the recessed portions 12f.

Figure 19:
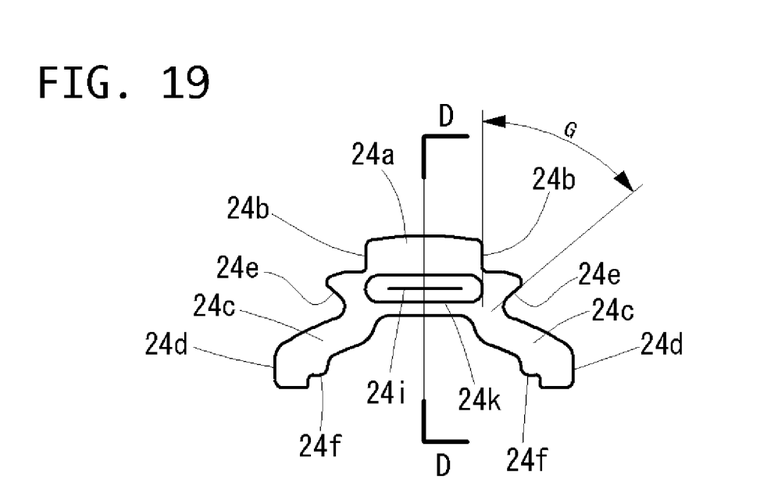
FIG. 19 is a front view showing a lever member which is used in a shift device of the fourth embodiment.
Figure 20:
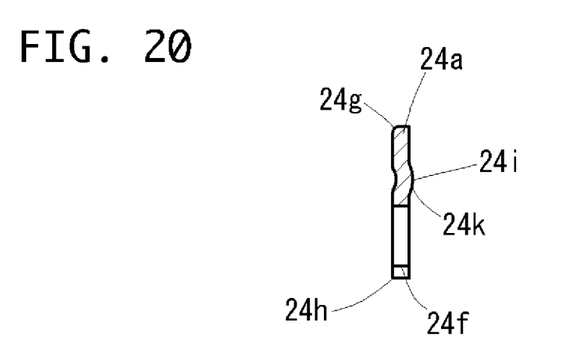
FIG. 20 is a cross-sectional view showing the lever member shown in FIG. 19.

The lever members 24 are formed by press forming, using plate material thinner that of the first embodiment, with a convex portion 24k. The convex portion 24k is positioned in vicinity of the press portion 24i that functions as the point of load of the leverage operation The other construction of the fourth embodiment is similar to that of the first embodiment.

The operation of the shift device of the fourth embodiment is similar to that of the first embodiment.

The shift device of the fourth embodiment can provide the following advantage in addition to those of the first embodiment.

The synchronizer rings 22 and the lever members 24 can be light in weight, thereby improving the shift feeling and decreasing its manufacturing cost.

While there have been particularly shown and described with reference to preferred embodiments thereof, it will be understood that various modifications may be made therein, and it is intended to cover in the appended claims and all such modifications as fall within the true spirit and scope of the invention.

The number of the lever members 24 is two in the embodiments, but it is not limited and it may be three or more. For example, when the three lever members 24 are used, they are preferably disposed to shift at intervals of 60° in the circumferential direction.

The speed gear is not limited to the first-speed gear or the second speed gear.

The friction surfaces may be formed with an oil groove or like a screw. They may be coasted on their surfaces with carbon material.

The entire contents of Japanese Patent Application No. 2012-235112 filed Oct. 24, 2012 are incorporated herein by reference.

What is claimed is:

1. A shift device with a synchronizer comprising:
 a shaft;
 a hub having a boss portion fixed to the shaft, a flange portion extending from the boss portion outwardly in a radial direction, and an annular portion formed with outer splines on an outer side, the annular portion and the flange portion being formed at both sides thereof in an axial direction with a plurality of cut-off portions and a plurality of recessed portions, the cut-off portions being provided on the both sides thereof in a rotational direction with a first guide surface, and the recessed portions being provided on the both inner sides thereof in the radial direction with a second guide surface parallel to the first guide surface;
 a shift sleeve that is formed on a circumferential surface thereof with inner splines having slanted surfaces, the inner splines being engaged with the outer splines of the hub in such a way that the shift sleeve is movable in the axial direction;
 a pair of speed gears that are arranged at the both sides in the axial direction of the hub to be rotatably supported on the shaft, the speed gears being provided at each hub side thereof with a cone surface and splines engageable with the splines of the shift sleeve;

a pair of synchronizer rings that are respectively arranged between the hub and the speed gears, the synchronizer rings being provided with a friction surface capable of being pressed selectively by one of the cone surfaces of the speed gears, and the synchronizer rings being provided at the hub sides with a plurality of projections projecting in the axial direction and a plurality of pressure receiving surfaces; and a plurality of lever members that are arranged at the both sides of the hub among the shift sleeve, the hub and the synchronizer rings, the lever members having a top portion and arm portions provided at the both sides in the rotational direction of the top portion, the top portion being provided on the both sides in the rotational direction thereof with a first slide surface contactable with the first guide surface of the hub and a press surface at a hub side thereof, the arm portion being provided on an end thereof in the rotational direction with a second slide surface contactable with the second guide surface of the hub, the top portion being engaged with the corresponding cut-off portion of the hub and contactable with the corresponding slanted surface of the shift sleeve to function as a point of effort of leverage, contact portions between radially inner sides of the arm portions and the hub functioning as a fulcrum of the leverage, contact portions between the pressure receiving surface of the synchronizer rings and the press surfaces of the top portions functioning as a point of load of the leverage, and the lever members amplifying pressing force from the shift sleeve due to a leverage operation to transmit amplified force to the synchronizer rings, wherein the lever members are further provided with a torque receiving surface capable of receiving friction torque from the projections of the synchronizer rings on an intermediate portion of each arm portion between the top portion and the second slide surface.

2. The shift device according to claim 1, wherein the lever members include a plurality of first lever members used for pressing one of the synchronizer rings, and a plurality of second lever members used for pressing the other of the synchronizer rings, and wherein the first lever members and the second lever members are alternately arranged at the both sides of the hub with a phase shift in the rotational direction.

3. The shift device according to claim 2, wherein the recessed portion at one side of the hub and the recessed portion at the other side thereof are partially overlapped in the axial direction.

4. The shift device according to claim 3, further comprising:

a spring that always pushes the lever members outwardly in the radial direction.

5. The shift device according to claim 4, wherein the spring includes elastic portions each imparting elastic force to the corresponding lever member outwardly in the radial direction between the lever members and the boss portion of the hub, and wherein the elastic portions corresponding to the plurality of lever members are connected with each other.

6. The shift device according to claim 5, wherein the hub is provided with a first supporting portion capable of supporting a first outer-diameter portion at a speed-gear side end portion of the synchronizer ring and a second supporting portion capable of supporting a second outer-diameter portion formed by the projections of the synchronizer rings.

7. The shift device according to claim 4, wherein the spring includes at least one of a first surface and a second surface, and wherein
the first surface is inserted between the lever member and the hub, and the second surface is inserted between the lever member and the pressure receiving surface of the synchronizer ring.

8. The shift device according to claim 7, wherein the hub is provided with a first supporting portion capable of supporting a first outer-diameter portion at a speed-gear side end portion of the synchronizer ring and a second supporting portion capable of supporting a second outer-diameter portion formed by the projections of the synchronizer rings.

9. The shift device according to claim 3, wherein the hub is provided with a first supporting portion capable of supporting a first outer-diameter portion at a speed-gear side end portion of the synchronizer ring and a second supporting portion capable of supporting a second outer-diameter portion formed by the projections of the synchronizer rings.

10. The shift device according to claim 2, further comprising:

a spring that always pushes the lever members outwardly in the radial direction.

11. The shift device according to claim 10, wherein the spring includes elastic portions each imparting elastic force to the corresponding lever member outwardly in the radial direction between the lever members and the boss portion of the hub, and wherein the elastic portions corresponding to the plurality of lever members are connected with each other.

12. The shift device according to claim 11, wherein the hub is provided with a first supporting portion capable of supporting a first outer-diameter portion at a speed-gear side end portion of the synchronizer ring and a second supporting portion capable of supporting a second outer-diameter portion formed by the projections of the synchronizer rings.

13. The shift device according to claim 10, wherein the spring includes at least one of a first surface and a second surface, and wherein
the first surface is inserted between the lever member and the hub, and the second surface is inserted between the lever member and the pressure receiving surface of the synchronizer ring.

14. The shift device according to claim 13, wherein the hub is provided with a first supporting portion capable of supporting a first outer-diameter portion at a speed-gear side end portion of the synchronizer ring and a second supporting portion capable of supporting a second outer-diameter portion formed by the projections of the synchronizer rings.

15. The shift device according to claim 2, wherein the hub is provided with a first supporting portion capable of supporting a first outer-diameter portion at a speed-gear side end portion of the synchronizer ring and a second supporting portion capable of supporting a second outer-diameter portion formed by the projections of the synchronizer rings.

16. The shift device according to claim 2, wherein at least one of the synchronizer rings comprises a first synchronizer ring at an outer side in the radial direction, a second synchronizer ring at an inner side in the radial direction, and an intermediate ring arranged between the first synchronizer ring and the second synchronizer ring, wherein the intermediate ring rotates together with the speed gear, being provided with a first cone surface and a second cone surface, wherein the first synchronizer ring is provided with the friction surface capable of being pressed on the first cone surface, and the plurality of projections and the pressure receiving surfaces on a hub side of the first synchronizer ring, wherein the second synchronizer ring is provided with the friction surface capable of being pressed on the second cone surface of the intermediate ring and with a plurality of projections engageable with radially inner sides of the arm portions of the lever member at the hub side, and wherein the lever members includes the arm portion at both sides of the top portion in the rotational direction, the arm portions being formed on inner sides thereof in the radial direction with second torque receiving surfaces capable of receiving the friction torque from the projections of the second synchronizer ring.

17. The shift device according to claim 1, further comprising:
a spring that always pushes the lever members outwardly in the radial direction.

18. The shift device according to claim 17, wherein
the hub is provided with a first supporting portion capable of supporting a first outer-diameter portion at a speed-gear side end portion of the synchronizer ring and a second supporting portion capable of supporting a second outer-diameter portion formed by the projections of the synchronizer rings.

19. The shift device according to claim 1, wherein
the hub is provided with a first supporting portion capable of supporting a first outer-diameter portion at a speed-gear side end portion of the synchronizer ring and a second supporting portion capable of supporting a second outer-diameter portion formed by the projections of the synchronizer rings.

20. The shift device according to claim 1, wherein
at least one of the synchronizer rings comprises a first synchronizer ring at an outer side in the radial direction, a second synchronizer ring at an inner side in the radial direction, and an intermediate ring arranged between the first synchronizer ring and the second synchronizer ring, wherein the intermediate ring rotates together with the speed gear, being provided with a first cone surface and a second cone surface, wherein the first synchronizer ring is provided with the friction surface capable of being pressed on the first cone surface, and the plurality of projections and the pressure receiving surfaces on a hub side of the first synchronizer ring, wherein the second synchronizer ring is provided with the friction surface capable of being pressed on the second cone surface of the intermediate ring and with a plurality of projections engageable with radially inner sides of the arm portions of the lever member at the hub side, and wherein the lever members includes the arm portion at both sides of the top portion in the rotational direction, the arm portions being formed on inner sides thereof in the radial direction with second torque receiving surfaces capable of receiving the friction torque from the projections of the second synchronizer ring.

* * * * *